US012614745B2

(12) United States Patent
Iguchi

(10) Patent No.: US 12,614,745 B2
(45) Date of Patent: Apr. 28, 2026

(54) POWER SUPPLY SYSTEM, CONTROL METHOD, AND PROGRAM

(71) Applicant: HONDA MOTOR CO., LTD., Tokyo (JP)

(72) Inventor: Tsuyoshi Iguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 543 days.

(21) Appl. No.: 18/118,159

(22) Filed: Mar. 7, 2023

(65) Prior Publication Data

US 2023/0317990 A1 Oct. 5, 2023

(30) Foreign Application Priority Data

Mar. 31, 2022 (JP) ................................ 2022-059335

(51) Int. Cl.
*H01M 8/04* (2016.01)
*H01M 8/04537* (2016.01)

(52) U.S. Cl.
CPC ... *H01M 8/04619* (2013.01); *H01M 8/04559* (2013.01); *H01M 8/04589* (2013.01)

(58) Field of Classification Search
CPC ......... H01M 8/04619; H01M 8/04559; H01M 8/04589
See application file for complete search history.

(56) References Cited

U.S. PATENT DOCUMENTS

2017/0141419 A1* 5/2017 Wu .......................... A62C 3/08
2019/0006689 A1 1/2019 Nada
2021/0114483 A1 4/2021 Hamachi et al.

FOREIGN PATENT DOCUMENTS

JP 2010-218691 9/2010
JP 2010-244919 10/2010
JP 2013-051879 3/2013
JP 2016-127632 7/2016
JP 2017-117673 6/2017
JP 2019-013062 1/2019
JP 2020-068547 4/2020
JP 2021-068518 4/2021
JP 2002-118979 4/2022

OTHER PUBLICATIONS

Japanese Office Action for Japanese Patent Application No. 2022-059335 mailed Nov. 21, 2023.

* cited by examiner

*Primary Examiner* — Olatunji A Godo

(74) *Attorney, Agent, or Firm* — Amin, Turocy & Watson, LLP

(57) ABSTRACT

A power supply system includes a fuel cell, a first voltage converter that performs voltage conversion on an output voltage of the fuel cell, a power storage device, a second voltage converter connected in parallel to the first voltage converter with respect to a load to perform voltage conversion on an output voltage of the power storage device, and a controller. The controller performs control to cause the fuel cell to generate electric power less than electric power to be consumed by the load after the fuel cell has started up and before electric power is supplied to the load and to charge the power storage device with the electric power generated by the fuel cell, and then performs control to start supply of electric power from the power supply system to the load.

4 Claims, 5 Drawing Sheets

FIG. 1

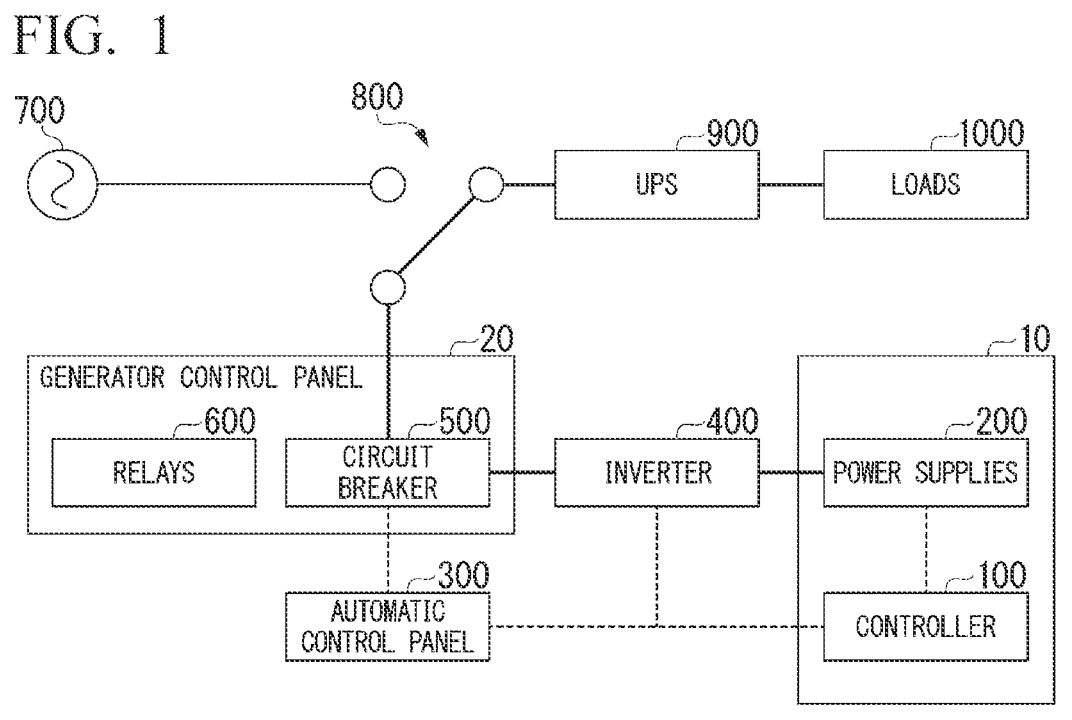

700
800
UPS
900
LOADS
1000
GENERATOR CONTROL PANEL
20
10
RELAYS
600
CIRCUIT BREAKER
500
INVERTER
400
POWER SUPPLIES
200
AUTOMATIC CONTROL PANEL
300
CONTROLLER
100

200
BAT VCU
BATTERY
220
230
V(DC BUS VOLTAGE)
I(LOAD CURRENT)
400
INVERTER
250
210-2
211-2
212-2
I1
210-1
211-1
212-1
I1
52
53
54
55
56
A
B
C
D
E
F
I1 CURRENT COMMAND(P/2)
100
CONTROLLER
LOAD POWER P (I×V)

LOAD

FC VCU

FC

BAT VCU

BATTERY

FIG. 6

ELECTRIC POWER

LOAD POWER

100%

FC OUTPUT POWER

BATTERY OUTPUT POWER

0%

ABOUT 2 SECONDS

TIME

CONNECT WITH LOAD

POWER SUPPLY SYSTEM, CONTROL METHOD, AND PROGRAM

CROSS-REFERENCE TO RELATED APPLICATION

Priority is claimed on Japanese Patent Application No. 2022-059335, filed Mar. 31, 2022, the content of which is incorporated herein by reference.

BACKGROUND OF THE INVENTION

Field of the Invention

The present invention relates to a power supply system, a control method, and a program.

Description of Related Art

When a power outage occurs, an emergency power supply is connected to loads. At that time, since the emergency power supply is suddenly depleted of electric power by the loads, it has to output electric power to cope with load power that fluctuates sharply from 0% to 100%. In recent years, a fuel cell has been used as an emergency power supply in order to reduce adverse effects on the global environment (see, for example, Patent Document 1 (Japanese Unexamined Patent Application, First Publication No. 2002-118979)).

FIG. 5 is a diagram showing a configuration example in a case where a fuel cell is used as an emergency power supply. FIG. 5 shows a power supply system including a fuel cell (FC), a fuel cell voltage and current control unit (FC VCU), a battery voltage and current control unit (BAT VCU), and a battery.

The FC VCU controls FC power. The BAT VCU controls battery power. As shown in FIG. 5, a battery with higher responsiveness to the FC is connected in parallel to the FC.

Figure 6:
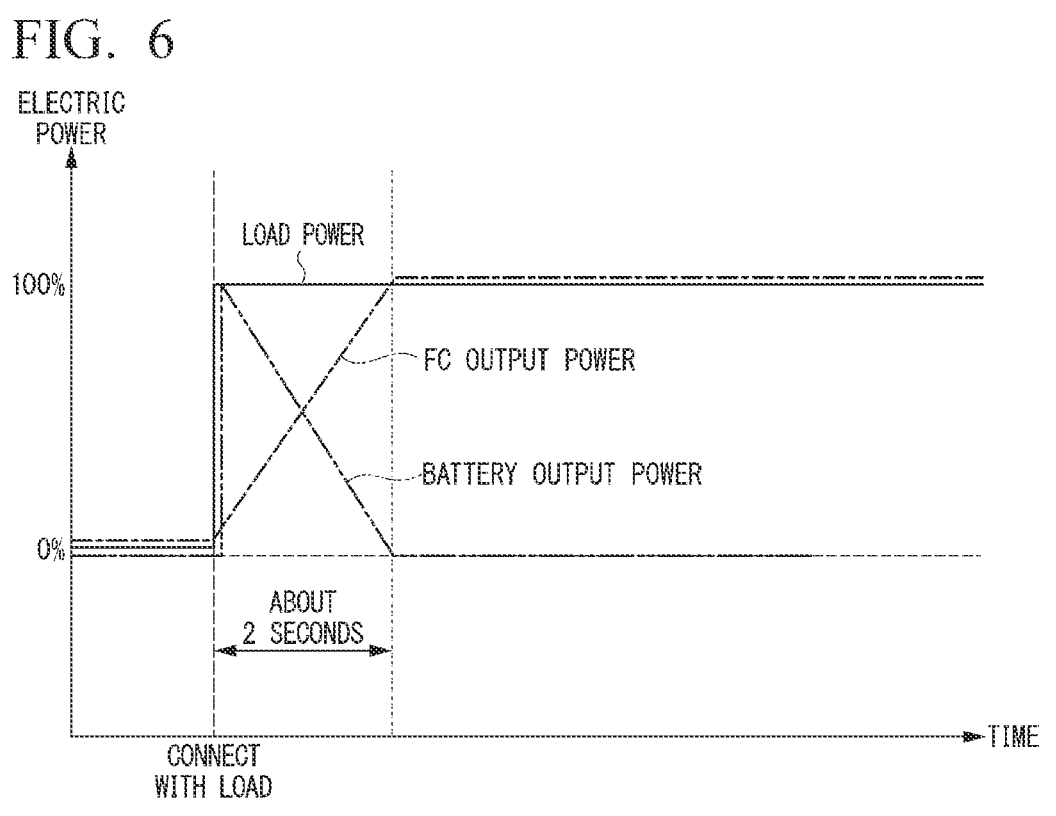

FIG. 6 is a diagram showing changes in electric power during load connection. As shown in FIG. 6, when the load is connected, an output from the battery rises from 0% to 100% at once. Thereafter, the output from the battery decreases to 0% over about two seconds in accordance with a rise in output power of the FC.

SUMMARY OF THE INVENTION

In this way, since a battery needs to output 100% of load power during load connection, a large BAT VCU capable of supplying 100% of load power has been required.

The present invention was contrived in view of such circumstances, and one object thereof is to provide a technique of reducing the size of a BAT VCU.

The following configurations are adopted in a power supply system according to this invention.

(1) According to an aspect of this invention, a power supply system is provided including: a fuel cell; a first voltage converter that performs voltage conversion on an output voltage of the fuel cell; a power storage device; a second voltage converter connected in parallel to the first voltage converter with respect to a load to perform voltage conversion on an output voltage of the power storage device; and a controller, wherein the controller performs control to cause the fuel cell to generate electric power less than electric power to be consumed by the load after the fuel cell has started up and before electric power is supplied to the load and to charge the power storage device with the electric power generated by the fuel cell, and then performs control to start supply of electric power from the power supply system to the load.

(2) In the power supply system according to the aspect of the above (1), the controller may perform control to cause the fuel cell to generate approximately half of electric power to be consumed by the load after the fuel cell has started up and before electric power is supplied to the load and to charge the power storage device with the electric power generated by the fuel cell, and then perform control to start supply of electric power from the power supply system to the load.

(3) According to an aspect of this invention, a control method is provided including causing one or more computers to, in a power supply system provided with a fuel cell, a first voltage converter that performs voltage conversion on an output voltage of the fuel cell, a power storage device, and a second voltage converter connected in parallel to the first voltage converter with respect to a load to perform voltage conversion on an output voltage of the power storage device, perform control to cause the fuel cell to generate electric power less than electric power to be consumed by the load after the fuel cell has started up and before electric power is supplied to the load and to charge the power storage device with the electric power generated by the fuel cell, and then perform control to start supply of electric power from the power supply system to the load.

(4) According to an aspect of this invention, a program is provided causing one or more computers to, in a power supply system provided with a fuel cell, a first voltage converter that performs voltage conversion on an output voltage of the fuel cell, a power storage device, and a second voltage converter connected in parallel to the first voltage converter with respect to a load to perform voltage conversion on an output voltage of the power storage device, perform control to cause the fuel cell to generate electric power less than electric power to be consumed by the load after the fuel cell has started up and before electric power is supplied to the load and to charge the power storage device with the electric power generated by the fuel cell, and then perform control to start supply of electric power from the power supply system to the load.

According to the aspects of (1) to (4), the output of the power storage device can be made smaller than in the related art, it is possible to reduce the size of the BAT VCU.

BRIEF DESCRIPTION OF THE DRAWINGS

FIG. 1 is a diagram showing a configuration example including a power supply system 10 according to an embodiment.

FIG. 6 is a diagram showing changes in electric power during load connection in the related art.

DETAILED DESCRIPTION OF THE INVENTION

Figure 2:
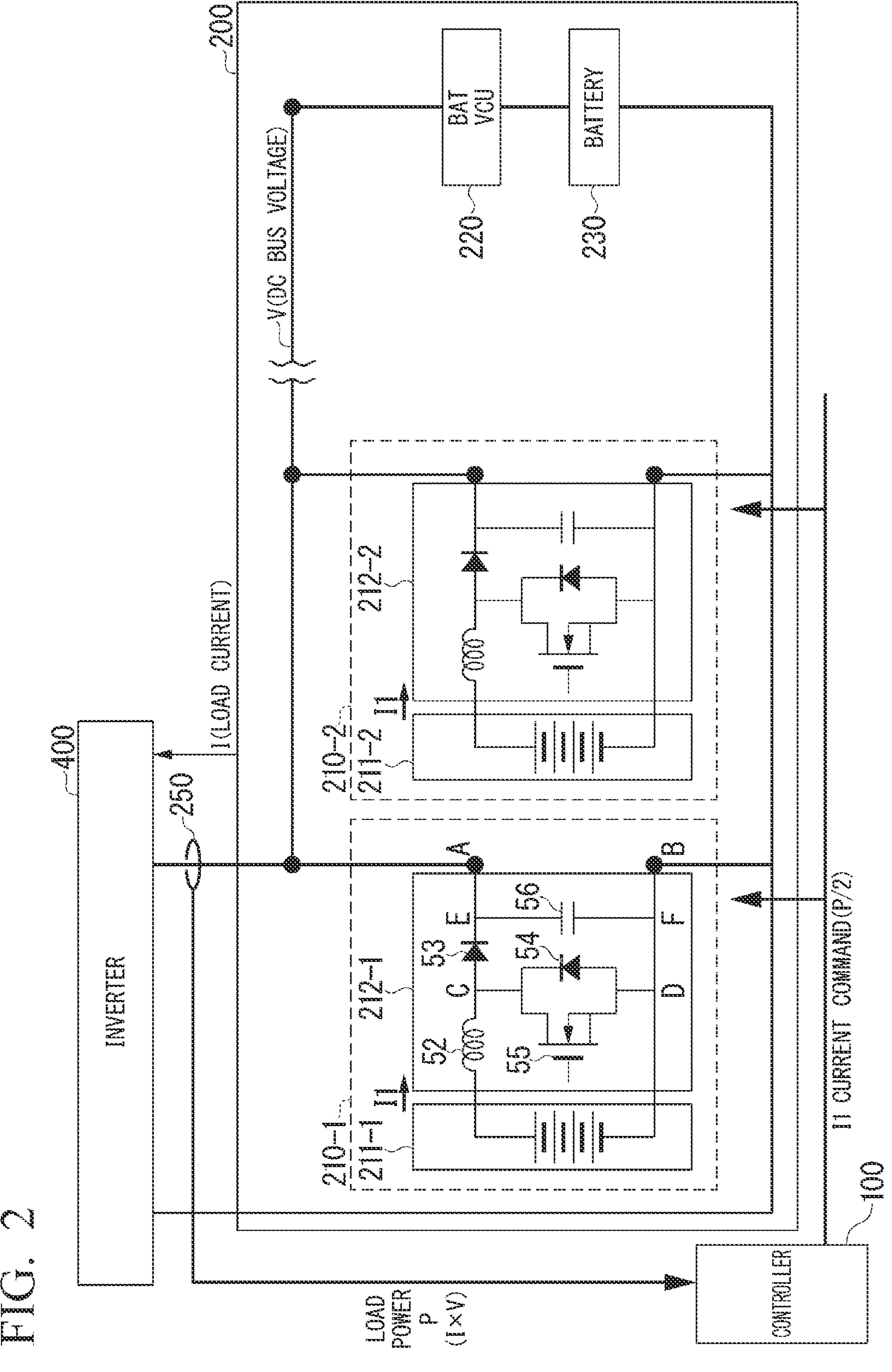
FIG. 2 is a diagram showing a configuration example of power supplies 200.

Hereinafter, an embodiment of a power supply system, a control method, and a program of the present invention will be described with reference to the accompanying drawings.

FIG. 1 is a diagram showing a configuration example including a power supply system 10 of an embodiment of the present invention. FIG. 1 shows the power supply system 10, an inverter 400, a generator control panel 20, a GRID 700, a switching unit 800, an uninterruptible power supply (UPS) 900, and loads 1000. In FIG. 1, solid lines indicate electric power lines and broken lines indicate communication lines. A controller area network (CAN) is a communication protocol in a case where communication is performed using a communication line.

The power supply system 10 supplies electric power to the load in a case where the supply of electric power from the GRID 700 is cut off. The inverter 400 converts DC power output from the power supply system 10 to AC power. The generator control panel 20 includes a circuit breaker 500 and relays 600. The circuit breaker 500 switches the source of supply of electric power to the load between the GRID 700 and the power supply system 10 using the switching unit 800 under control of an automatic control panel 300. The relays 600 are constituted by, for example, a frequency relay, an overcurrent relay, an overvoltage/undervoltage relay, a ground fault detection relay, and the like.

The automatic control panel 300 controls the power supply system 10, the inverter 400, and the generator control panel 20. The GRID 700 is an electric power system such as an electric power company that supplies electric power to the loads 1000. The UPS temporarily supplies electric power to the loads 1000 in a case where the supply of electric power to the loads 1000 is cut off.

The power supply system 10 includes a controller 100 and power supplies 200. The controller 100 controls the power supplies 200. The power supplies 200 supply electric power using a fuel cell. The power supply system 10 is provided with various auxiliary machines related to the power supplies 200, a battery for operating the auxiliary machines, and a supply mechanism that supplies hydrogen to the power supplies 200 under control of the automatic control panel 300, which are omitted in the drawing.

FIG. 2 is a diagram showing a configuration example of the power supplies 200. The power supplies 200 are constituted by two fuel cell stacks (FCSs) 210-1 and 210-2, a battery voltage and current control unit (BAT VCU) 220, a battery 230, and a current sensor 250. In a case where the FCSs 210-1 and 210-2 need not be specifically distinguished from each other, they are referred to as the FCS 210. Although two FCSs 210 are shown as an example, the number thereof need only be one or more. The FCSs 210 can be notified of commands from the controller 100. The battery 230 is an example of a power storage device.

The FCSs 210-1 and 210-2 are connected in parallel to the load. The BAT VCU 220 and the battery 230 are connected in series to each other and are connected in parallel to the FCSs. A load current I and a DC bus voltage V are output to the inverter 400. The controller 100 obtains load power P from the load current I and the DC bus voltage V detected by the current sensor 250 and issues a current command for a current I1 in order to cause each of the FCSs 210 to output electric power P/2. In a case where N FCSs are connected in parallel to each other, the controller 100 issues a current command for the current I1 in order to cause each of the FCSs 210 to output electric power P/N.

Since the two FCSs 210 have the same configuration, the configuration will be described using the FCS 210-1. The FCS 210-1 is constituted by a fuel cell (FC) 211-1 and a fuel cell voltage and current control unit (FC VCU) 212-1. A resistor 52 and a diode 53 are connected in series to the positive electrode side of an FC 211-1. The cathode of the diode 53 is connected to a terminal A. The anode of the diode 53 is connected to the resistor 52. A reactor 55 and a diode 54 are connected in parallel to each other and are connected to a terminal C and a terminal D, respectively. The terminal C is provided between the resistor 52 and the diode 53. A terminal D is connected to the negative electrode side of the FC 211-1. A capacitor 56 is connected to a terminal E and a terminal F. The terminal E is a terminal which is connected to the cathode side of the diode 53. The terminal F is a terminal which is connected to the negative electrode side of the FC 211-1. In the following description, in a case where the FCs 211-1 and 211-2 need not be specifically distinguished from each other, they are referred to as the FC 211. In a case where the FC VCUs 212-1, 212-2, and 212-3 need not be specifically distinguished from each other, they are referred to as the FC VCU 212. The FC VCU 212 is an example of a first voltage converter that converts the output voltage of the fuel cell.

The battery 230 supplies electric power during load connection. The battery 230 is a battery with higher responsiveness to the FCs 211-1 and 211-2. The BAT VCU 220 is connected in parallel to the FC VCU 212 with respect to the loads 1000, performs voltage conversion on the output voltage of the battery 230, and performs electric power regeneration for stably supplying a DC bus voltage and suppressing an FC open circuit voltage (OCV) voltage. The BAT VCU 220 is an example of a second voltage converter.

Figure 3:
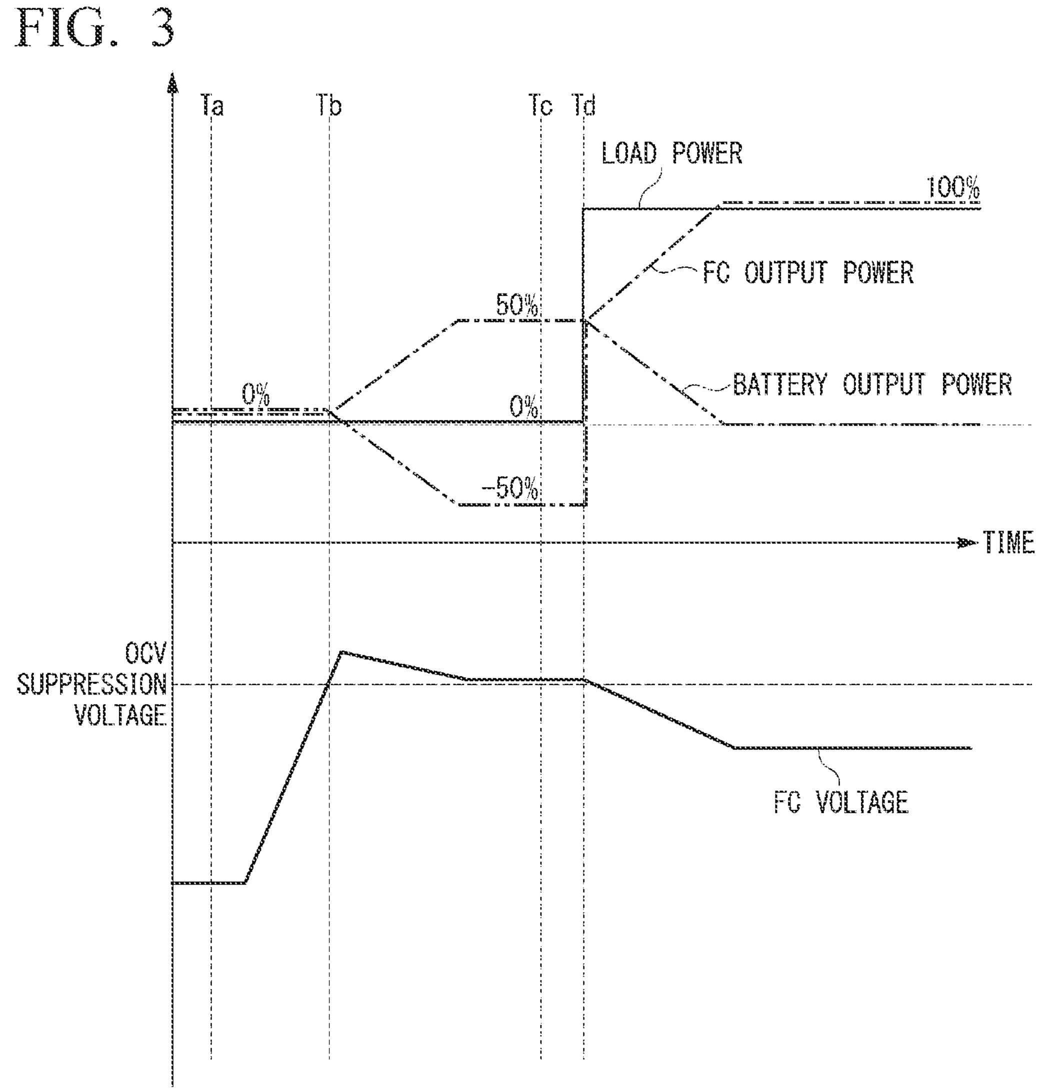
FIG. 3 is a graph showing change in parameters.

Based on the above configuration, the details of control according to the present embodiment will be described below. FIG. 3 is a graph showing changes in parameters through control according to the present embodiment. FIG. 3 shows load power, FC output power, battery output power, and an FC voltage. The part above the time axis shows changes in load power, FC output power, and battery output power, and this vertical axis shows units of electric power. The part below the time axis shows a change in an FC voltage, and this vertical axis shows units of voltage. In FIG. 3, the load power and the FC voltage are shown by solid lines. The FC output power is shown by a single dashed line. The battery output power is shown by a two-dot dashed line.

Here, the above load power indicates electric power supplied to the load. The FC output power indicates electric power which is output by the FC 211. The battery output power indicates electric power which is output by the battery 230. The FC voltage indicates a voltage which is output by the FC 211. In addition, "100%" and "50%" shown in FIG. 3 indicate a ratio to electric power determined in advance as electric power to be used by the load. When the electric power determined in advance as electric power to be used by the load is set to X, 100% is X and 50% is 0.5X. In the following description, the electric power determined in advance as electric power to be used by the load may be referred to as load utilized power.

FIG. 3 shows timings Ta, Tb, Tc, and Td. The timing Ta is a timing at which electric power of the GRID 700 is cut off, and indicates a timing at which the FC 211 is replenished with hydrogen. The timing Tb indicates a suppression control start timing of the FC OCV. The timing Tc indicates a timing at which FC startup preparation is completed. The timing Td indicates a timing at which the power supply system 10 is connected to the loads 1000.

First, at the timing Ta, when the FC 211 is replenished with hydrogen, the FC 211 starts to generate electric power. This causes the FC voltage to gradually rise. When the FC voltage reaches the OCV suppression voltage (timing Tb), the BAT VCU 220 starts suppression control of the FC OCV, which causes the FC voltage to gradually decrease. The start of suppression control of the FC OCV causes a current to start to flow, which leads to a rise in the FC output power. On the other hand, the battery 230 is charged by the amount of the FC output power. The startup preparation time can be shortened by lowering the OCV suppression voltage.

When the FC output power reaches 50% of the load utilized power and thus the FC startup preparation is completed (timing Tc), the power supply system 10 is connected to the loads 1000 by the switching unit 800 at the timing Td. In this case, since the FC output power has already reached 50% of the load utilized power, 50% of the load utilized power is sufficient for the battery output power. That is, it is possible to reduce the size of the BAT VCU because only half electric power in the related art is required. After the timing Td, the FC output power increases and the battery output power decreases accordingly to 0.

Here, setting the FC output power to 50% of the load utilized power will be described. In a case where the FC output power is set to a value A % greater than 50% of the load utilized power, the charging load of A % greater than 50% is applied to the battery 230, for example, at the timing Tc, which leads to an undesirable result. On the other hand, in a case where the FC output power is set to a value B % less than 50% of the load utilized power, the battery 230 has to output electric power of B % greater than 50%, for example, at a timing Tc. For this reason, it is not possible to reduce the size of the BAT VCU more than in a case where the battery is sufficient to output 50%. From the above, it can be understood that setting the FC output power to 50% of the load utilized power is theoretically optimal. The purpose of the present embodiment is that it is possible to reduce the size of the BAT VCU by increasing the FC output power to greater than 0% in advance before connection to the load. Therefore, the FC output power before connection to the load may be appropriately determined in accordance with the circuit configuration, usage environment, or the like.

Figures 4, 5:
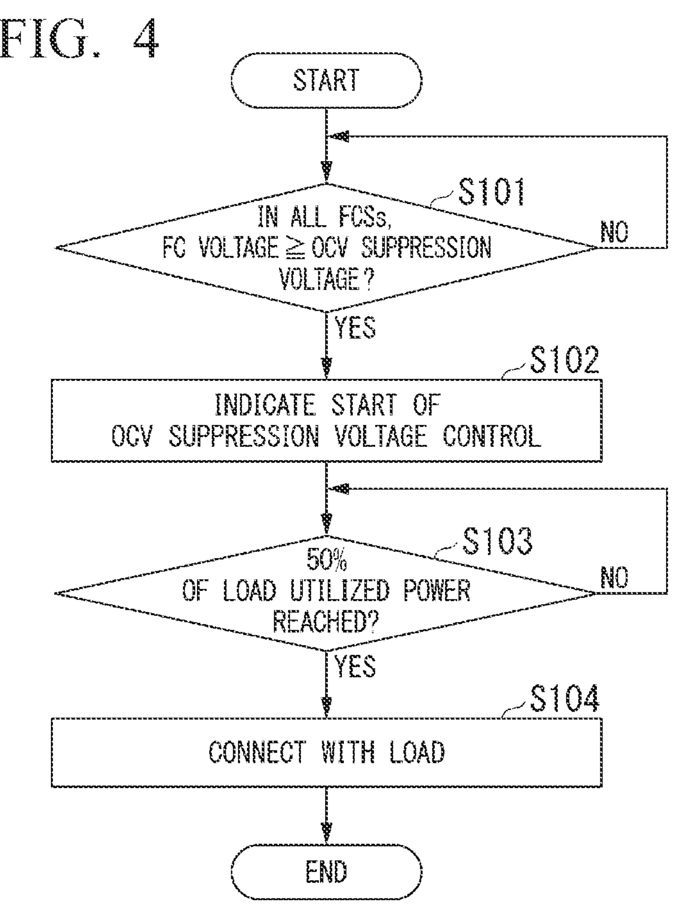
FIG. 4 is a flowchart showing the details of control performed by a controller 100.
FIG. 5 is a diagram showing a configuration example of the related art.

The control described above will be described below with reference to a flowchart. FIG. 4 is a flowchart showing the details of control performed by the controller 100. This flowchart shows processing from the timing Ta. The flowchart shown in FIG. 4 shows a flow of processing in a configuration in which N FCSs 210 are provided.

In FIG. 4, the controller 100 determines whether the FC voltages of all the N FCSs 210 are equal to or higher than the OCV suppression voltage (step S101). Here, since the controller 100 is periodically notified of the FC voltages from the N FCSs 210, and the determination in step S101 is performed using the FC voltages.

When the FC voltages of all N the FCSs 210 become equal to or higher than the OCV suppression voltage in step S101, the controller 100 instructs the BAT VCU 220 to start OCV suppression voltage control (step S102). The OCV suppression voltage control prevents the voltage from becoming greater than the OCV suppression voltage. The controller 100 determines whether the output power from all the FCSs 210 has reached 50% of the load utilized power (step S103). In step S103, in a case where the output power from all the FCSs 210 reaches 50% of the load utilized power, the controller 100 requests the automatic control panel 300 to switch the switching unit 800, and thus the power supply system 10 is connected to the loads 1000 (step S104). Thereafter, the processing of this flowchart ends. The automatic control panel 300 requested to switch the switching unit 800 requests the circuit breaker 500 to switch the switching unit 800, and thus a connection destination is switched by the switching unit 800.

As described above, the controller 100 performs control to cause the FC 211 to generate electric power less than the electric power to be consumed by the loads 1000 (for example, approximately half (50%) electric power) after the FC 211 has started up and before electric power is supplied to the loads 1000 and to charge the battery 230 with the electric power generated by the FC 211, and then performs control to start the supply of electric power from the power supply system 10 to the loads 1000.

According to the present embodiment, the output of the power storage device can be made smaller than in the related art, it is possible to reduce the size of the BAT VCU.

The above-described embodiment can be represented as follows.

a power supply system provided with a fuel cell, a first voltage converter that performs voltage conversion on an output voltage of the fuel cell, a power storage device, and a second voltage converter connected in parallel to the first voltage converter with respect to a load to perform voltage conversion on an output voltage of the power storage device, the system including:

a storage medium having computer-readable instructions stored therein; and a processor connected to the storage medium, wherein the processor executes the computer-readable instructions to perform control to cause the fuel cell to generate electric power less than electric power to be consumed by the load after the fuel cell has started up and before electric power is supplied to the load and to charge the power storage device with the electric power generated by the fuel cell, and then perform control to start supply of electric power from the power supply system to the load.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Power supply system
20 Generator control panel
52 Resistor
53, 54 Diode
55 Reactor
56 Capacitor
100 Controller
200 Power supplies
210, 210-1, 210-2 FCS
212-1 FC VCU
220 BAT VCU
230 Battery
250 Current sensor
300 Automatic control panel
400 Inverter
500 Circuit breaker
600 Relays
800 Switching unit
900 UPS
1000 Load

What is claimed is:

1. A power supply system comprising:

a fuel cell;

a first voltage converter that performs voltage conversion on an output voltage of the fuel cell;

a power storage device;

a second voltage converter connected in parallel to the first voltage converter with respect to a load to perform voltage conversion on an output voltage of the power storage device; and a controller, wherein the controller performs control to cause the fuel cell to generate electric power less than electric power to be consumed by the load and to charge the power storage device with the electric power generated by the fuel cell after the fuel cell has started up and before the power supply system is connected to the load, and then performs control to start supply of electric power from the power supply system to the load after the power supply system is connected to the load.

2. The power supply system according to claim 1, wherein the controller performs control to cause the fuel cell to generate approximately half of electric power to be consumed by the load after the fuel cell has started up and before electric power is supplied to the load and to charge the power storage device with the electric power generated by the fuel cell, and then performs control to start supply of electric power from the power supply system to the load.

3. A control method comprising causing one or more computers to, in a power supply system provided with a fuel cell, a first voltage converter that performs voltage conversion on an output voltage of the fuel cell, a power storage device, and a second voltage converter connected in parallel to the first voltage converter with respect to a load to perform voltage conversion on an output voltage of the power storage device, perform control to cause the fuel cell to generate electric power less than electric power to be consumed by the load and to charge the power storage device with the electric power generated by the fuel cell after the fuel cell has started up and before the power supply system is connected to the load, and then perform control to start supply of electric power from the power supply system to the load after the power supply system is connected to the load.

4. A program causing one or more computers to, in a power supply system provided with a fuel cell, a first voltage converter that performs voltage conversion on an output voltage of the fuel cell, a power storage device, and a second voltage converter connected in parallel to the first voltage converter with respect to a load to perform voltage conversion on an output voltage of the power storage device, perform control to cause the fuel cell to generate electric power less than electric power to be consumed by the load and to charge the power storage device with the electric power generated by the fuel cell after the fuel cell has started up and before the power supply system is connected to the load, and then perform control to start supply of electric power from the power supply system to the load after the power supply system is connected to the load.

* * * * *